United States Patent

Yoshimoto et al.

Patent Number: 5,376,917
Date of Patent: Dec. 27, 1994

[54] VEHICLE DISPLAY APPARATUS WITH DRIVE INFORMATION

[75] Inventors: Masayuki Yoshimoto, Toyoake; Takeshi Suzuki, Okazaki, both of Japan

[73] Assignee: Mitsubishi Jidosha Kogyo Kabushiki Kaisha, Tokyo, Japan

[21] Appl. No.: 930,892

[22] Filed: Aug. 17, 1992

[30] Foreign Application Priority Data

Aug. 19, 1991 [JP] Japan .................. 3-065276[U]
Aug. 19, 1991 [JP] Japan .................. 3-206815

[51] Int. Cl.$^5$ ............................... B60Q 3/00
[52] U.S. Cl. ........................ 340/438; 345/35; 116/286
[58] Field of Search ........... 116/286, 62.1, 62.2, 116/334; 345/140, 35, 37, 39; 340/705, 753, 754, 722, 438, 459, 461, 462, 525, 439, 984

[56] References Cited

U.S. PATENT DOCUMENTS

| 4,431,966 | 2/1984 | Pucciarello | 116/286 |
| 5,006,829 | 4/1991 | Miyamoto | 340/459 |
| 5,121,099 | 6/1992 | Hegg | 340/461 |
| 5,121,112 | 6/1992 | Nakadozono | 340/459 X |

FOREIGN PATENT DOCUMENTS

| 144337 | 2/1989 | Japan | 340/461 |
| 280916 | 3/1990 | Japan | 116/286 |
| 1384339 | 2/1975 | United Kingdom . | |
| 1407279 | 9/1975 | United Kingdom . | |

OTHER PUBLICATIONS

Slupek, C. L. et al. "Large-Scale Vacuum Fluorescent Displays". Automotive Engineering, vol. 97, No. 3 (Mar. 1989). pp. 47–50.

Webster's New World Dictionary, 3rd ed. NY, Simon & Schuster, Inc., 1988, p. 382.

Popular Science, Jan. 1992, pp. 43, 44 "Two-way Instruments".

Primary Examiner—Hezron E. Williams
Assistant Examiner—Christine K. Oda

[57] ABSTRACT

A vehicular display apparatus having a light transmitting display section activated by means of a high-luminance light source, and a high-luminance, self-glowing light emitting display section. The apparatus selectively operates one of these display sections which is selected by a selector switch, so that the selected display section can be visually perceived from the driver's seat side through a meter glass which has a low light transmittance characteristic, thereby making it possible to select a display form which can be observed by the driver with a high degree of contrast between the display section and the background, and which is suited to his preference.

23 Claims, 4 Drawing Sheets

VEHICLE DISPLAY APPARATUS WITH DRIVE INFORMATION

BACKGROUND OF THE INVENTION

The present invention relates to a vehicular display apparatus, and more particularly, to a vehicular display apparatus capable of displaying vehicle drive information with high visibility in an arbitrary one display form selected from a plurality of display forms.

In general, a vehicle is furnished with various meters which, facing the driver's seat, display information indicative of the vehicle drive conditions, including the operating states of various parts of the vehicle, so as to permit the driver to grasp the drive conditions. The meters in the vehicle are assorted depending on the vehicle model, and include a speedometer, water temperature indicator, oil-pressure gauge, tachometer, fuel gauge, some other instruments, and warning lamp, for example. Generally, several meters are arranged on the dashboard of the vehicle. Also available is a combination meter which comprises several kinds of meters intensively arranged in a case.

In general, moreover, the meters are illuminated so that they can be satisfactorily observed by the driver. There are various methods for illuminating the meters. For example, an instrument board for the meters may be illuminated by means of illuminating lamps which are arranged in front of the board, i.e., on the driver's-seat side with respect to the board. According to a transmissive illumination (back-lighting) method, on the other hand, a display section, which is composed of meter graduations, etc. formed on or through an instrument board, is illuminated by means of illuminating lamps which are arranged on the back of the board.

In the case of the conventional meter of the transmissive-illumination type, which uses a low-luminance light source such as an incandescent lamp, however, a satisfactory luminance cannot be obtained due to insufficiency of light quantity if a meter glass with a low light transmittance is used. Inevitably, therefore, it is necessary to use a meter glass with a relatively high light transmittance. Accordingly, the degree of contrast between the display section and the background is so low that the visibility of the conventional transmissive-illumination meter cannot be improved. When using an incandescent lamp which emits light containing red components in large quantities, a bluish cap or the like should be put on the lamp, in order to obtain white light. Even though this is done, it is difficult to obtain pure-white light.

With regard to the display form for a vehicular meter, it is known to make an analog display in which values are continuously indicated by rotary positions of a pointer on an instrument board, and a digital display in which digits are displayed. Analog display and digital display are different in properties related to visibility. In the case of a speedometer, for example, the analog display facilitates observation of speed variations, and therefore, is suited, e.g., for the indication of the speed of a vehicle running in an urban district or between hills or mountains where acceleration and deceleration are repeated frequently. On the other hand, the digital display facilitates an accurate reading of the speed, so that it is suited, e.g., for the indication of the speed of a vehicle running at constant speed on a freeway. Selection between the analog and digital displays also depends on the driver's taste.

Thus, in order to meet a wider variety of needs, there has recently been proposed a combination meter of the two-mode type which comprises, for example, analog and digital speedometers. According to the combination meter of this type, the display mode can be switched between the analog and digital display modes automatically in accordance with the running mode or by the driver's preference.

Typically, the conventional two-mode combination meter comprises a surface glass, which is formed by sticking a liquid crystal panel and a half-mirror together, and a liquid crystal panel drive unit for variably adjusting the light transmittance of the panel. For the analog display, the light transmittance of the liquid crystal panel is increased so that the surface glass becomes transparent, and the analog speedometer is illuminated indirectly by means of a cold-cathode discharge tube which is situated in front of and below the instrument board of the meter. Thus, the driver can visually perceive the analog speedometer as a real image through the surface glass. For the digital display, on the other hand, the light transmittance of the panel is lowered so that the surface glass becomes opaque, and a display on the digital speedometer, which is situated in front of and diagonally above the surface glass, is reflected toward the driver's by the surface glass. Thus, the driver can observe the meter display as a virtual image.

However, this conventional two-mode meter has many problems. For example, the surface glass should be selectively made transparent or opaque to ensure the mode switching between the analog display and digital display. Accordingly, the liquid crystal panel and the panel drive unit for changing the light transmittance of the panel are essential components, so that the meter entails high cost. When the temperature is so low that the light transmittance of the liquid crystal panel cannot be changed in a moment, moreover, the display mode cannot be instantly switched between the analog display and the digital display. Further, the use of the liquid crystal panel narrows the visual angle in the analog display mode. Since the instrument board is illuminated indirectly, moreover, the degree of contrast between the display information and the background in the analog display mode is so low that the visibility of the meter is lowered. The light transmittance of the liquid crystal panel must be increased in order to improve the visibility. In some cases, furthermore, the analog display and the digital display may be superposed on each other.

OBJECT AND SUMMARY OF THE INVENTION

An object of the present invention is to provide a vehicular display apparatus, which can use a meter glass with a low light transmittance characteristic and/or low light reflectance characteristic as a component of the display apparatus of the transmissive-illumination type, and can, therefore, display vehicle drive information with high visibility.

Another object of the present invention is to provide a vehicular display apparatus, in which an arbitrary one display form for vehicle drive information can-be selected from a plurality of display forms, and the display mode can be changed depending on the vehicle running conditions or by the driver's preference, for example.

Still another object of the present invention is to provide a vehicular display apparatus, which can change the display form without using a liquid crystal panel or the like, and therefore, is simple in construction and low-priced.

A vehicular display apparatus according to the present invention comprises at least one first display means including a high-luminance light source and a light transmitting display section opposed to the light source, at least one second display means including a high-luminance, self-glowing light emitting display section, a meter glass having at least one of a low light transmittance characteristic and a low light reflectance characteristic, switch means, and display switching means for selectively activating one of the at least one first display means and the at lease one second display means in accordance with the operating state of the switch means.

Preferably, the switch means is a selector switch manually operable or a switch circuit responsive to the drive conditions of a vehicle. The light transmitting display section is disposed on an instrument board of the display apparatus, and the light emitting display section is located on the surface of the instrument board, e.g., on that region of the surface of the board which corresponds to the light transmitting display section. The meter glass has the low light transmittance characteristic, and is located in front of the first and second display means. Alternatively, the meter glass has the low light reflectance characteristic, and is located in front of the first display means. In this case, the light emitting display section of the second display means is located on the side away from the first display means with respect to the meter glass. The first and second display means are designed for analog display and digital display, respectively, for example.

More preferably, the meter glass is formed of blackface glass obtained by adding a desired amount of pigment to transparent acrylic resin glass. Preferably, the light transmittance and/or reflectance of the meter glass ranges from approximately 3% to 5%. The light source of the first display means is a cold-cathode discharge tube, and the light emitting display section is a high-luminance light emitting diode or high-luminance fluorescent display tube. The display switching means includes a storage section for storing information on the respective states of display operation of the first and second display means immediately before an engine of the vehicle, furnished with the display apparatus, is stopped, and selectively activates a corresponding one of the two display means at the start of engine operation, in accordance with the information stored in the storage section.

The present invention is advantageous in that the first display means, including the high-luminance light source and the light transmitting display section, and the second display means, including the high-luminance and self-glowing light emitting display section, are used, whereby the meter glass having the low light transmittance characteristic and/or low light reflectance characteristic can be used. Accordingly, each of the light transmitting and emitting display sections can be displayed through the meter glass with a sufficient light quantity, while the background of each display section is visually intercepted by the meter glass, so that the degree of contrast between the display section and the background is high. Thus, the driver can observe each display section with high visibility and feeling less tired. If each display section is de-energized, it becomes invisible from the driver side.

Another advantage of the present invention lies in that the display switching means which responds to the operating state of the switch means, such as the manual selector switch or the switch circuit responsive to the vehicle drive conditions, is provided, so that a required one of the display means can be selectively activated, whereby an arbitrary one display form can be selected from a plurality of display forms. Thus, the display form can be changed by the driver's preference or depending on the vehicle running conditions, for example. Unlike the conventional apparatus which uses the liquid crystal panel, moreover, the apparatus according to the present invention enjoys high visibility and a simple construction, which entails relatively low cost. Thus, according to the present invention, it is necessary only that the meter glass used be low both in light transmittance and in light reflectance. In contrast with the case of the liquid crystal panel, for example, the visual angle is unlimited, which also ensures higher visibility. Further, the light transmittance and light reflectance of the meter glass should only be set depending on the quantities of light at the display sections and other regions. Once the display apparatus is mounted in the vehicle, therefore, it is unnecessary to provide any drive unit, such as the one used to vary the light transmittance of the liquid crystal panel. Thus, the whole apparatus can be manufactured at very low cost. Since the respective properties of the light source and the meter glass for each display means are not dependent on temperature, the display mode never fails to be changed in a moment.

According to the present invention, furthermore, a display apparatus is provided, which has a light transmitting display section and a light emitting display section respectively located on an instrument board, and a meter glass located in front of first and second display means. This apparatus is advantageous in that a particularly simple construction can be used in displaying vehicle drive information with high visibility in a selected one of display forms. In another display apparatus according to the present invention, a meter glass with a low light reflectance characteristic is located in front of first display means, and a light emitting display section is located on the side away from the first display means with respect to the meter glass. According to this apparatus, the vehicle drive information can be displayed with high visibility in the selected display form even though the installation space for the apparatus is narrow. Also, this apparatus is advantageous in that the meter display can be made at any desired region on the meter glass. According to an alternative arrangement where a corresponding one of two display means, first and second, is selectively activated in accordance with information on the respective states of display operation of the first and second display means, stored immediately before the engine is stopped in the preceding cycle, it is possible to instantly start the display in a form suited to the driver's preference, for example.

DETAILED DESCRIPTION

Figure 1:
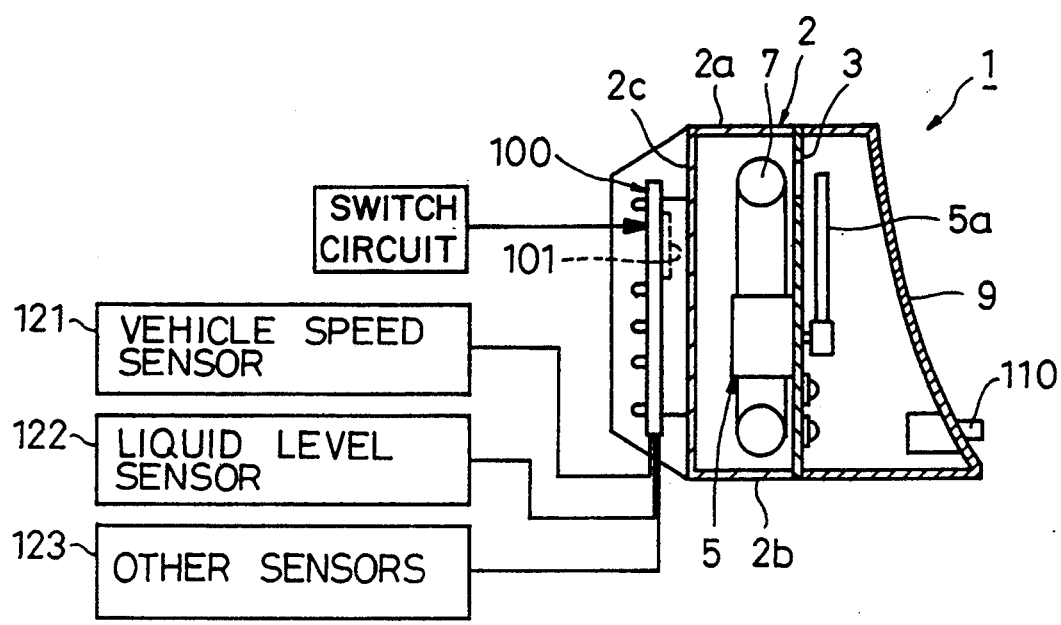
FIG. 1 is a sectional view showing a vehicular display apparatus according to a first embodiment of the present invention.
Figure 2:
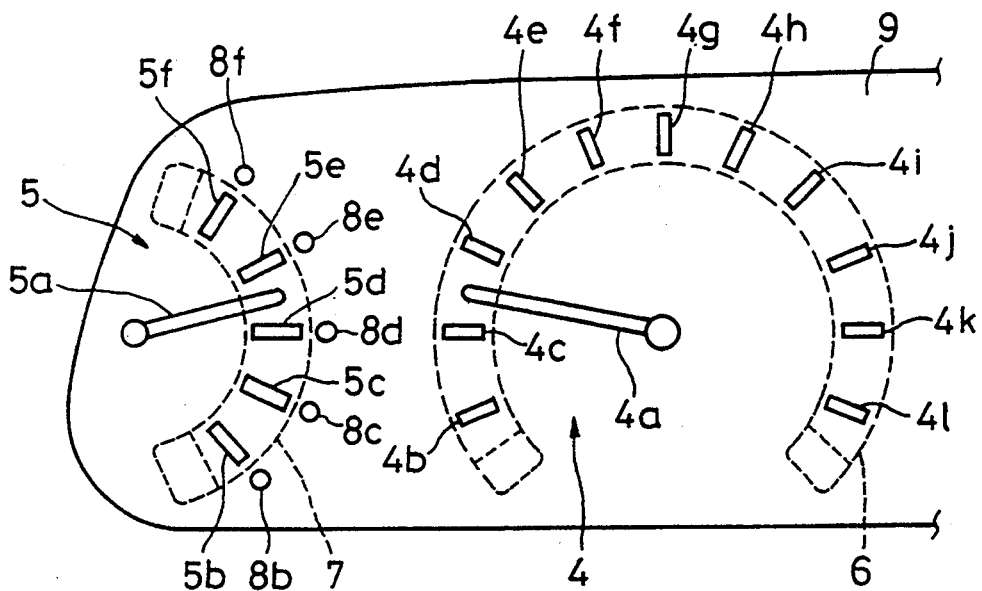
FIG. 2 is a partial front view of a meter shown in FIG. 1.

Referring to FIGS. 1 and 2, a combination meter 1 as a vehicular display apparatus according to a first embodiment of the present invention comprises a case 2, which has an upper wall 2a, a lower wall 2b, a rear wall 2c, and right- and left-hand side walls (not shown). The front of the case 2 is open. The case 2 is fitted with an instrument board 3 which is situated in a middle position in the depth direction of the meter 1. The instrument board 3 extends substantially parallel to the rear wall 2c of the case 2 so as substantially to cover the overall width and height of the meter 1. The respective bodies of a speedometer 4, a fuel gauge 5, and other instruments (not shown) are mounted on the rear surface of the board 3. The speedometer 4 and the fuel gauge 5 are arranged on the central portion and left-hand end portion, respectively, of the left-hand half of the instrument board 3 in the width direction of the meter 1, while the other instruments are arranged on the right-hand half (not shown) of the board 3.

The speedometer 4 includes a pointer shaft, which projects to the front of the instrument board 3 through a hole in the board, and a drive section accommodated in the speedometer body for rotating the shaft. A pointer 4a is mounted on the front end of the pointer shaft. Likewise, the fuel gauge 5 includes a pointer shaft, which is fitted with a pointer 5a and extends through a hole in the board 3, and a drive section accommodated in the fuel gauge body for rotating the shaft. The other instruments, like the meter 4 and the gauge 5, are each composed of a pointer shaft and a drive section, or in a different manner.

The instrument board 3 is an opaque structure, and a plurality of groups of slits (graduations) are bored through the board 3. Each slit group includes a plurality of slits which, in conjunction with the pointer of each corresponding meter, constitute a light transmitting display section of the meter. These slits are arranged concentrically with the pointer shaft of the meter and at intervals.

For instance, in the speedometer 4, e.g., eleven slits 4b, 4c, . . . , and 4l are arranged at regular angular intervals, along the rotating direction of the pointer 4a, on a speedometer forming section of the instrument board 3. These slits form a circular arc as a whole. The slit 4b represents a speed of 0 km/h, while the slit 4l represents the maximum speed of 100 km/h. Thus, the slits 4b to 4l are arranged at speed intervals of 10 km/h, and, in conjunction with the pointer 4a, continuously indicate the vehicle speed within the range from 0 to 100 km/h. In the fuel gauge 5, moreover, five slits 5b, 5c, . . . , and 5f, for example, are arranged at regular angular intervals along the rotating direction of the pointer 5a, forming a circular arc as a whole. The slit 5b represents an empty position, while the slit 5f represents a full position. Thus, the slits 5b to 5f, in conjunction with the pointer 5a, continuously indicate the fuel residue corresponding to the range from the empty position to the full position.

Illuminating lamps 6 and 7, for use as high-luminance light sources for the speedometer 4 and the fuel gauge 5, respectively, are mounted on the rear side of the instrument board 3. The lamps 6 and 7, which are in the form of a circular arc each, are arranged concentrically with the pointers 4a and 4b, respectively, so as to face the slits 4b to 4l and slits 5b to 5f, respectively. A high-luminance cathode discharge tube, e.g., cold-cathode discharge tube, is used as each of the lamps 6 and 7. The cold-cathode discharge tube enjoys higher luminance than that of an incandescent lamp, and can easily produce even white light. Light sources for the other instruments are arranged in like manner.

Part of a light emitted from the cold-cathode discharge tube 6, for use as the light source for the speedometer 4, is guided through a light guide member (not shown) to the respective proximal ends of the pointers 4a and 5a, thereby illuminating the whole pointers with high luminance. Besides the cold-cathode discharge tube 6, a common or separate light sources may be provided for illuminating the pointers 4a and 5a.

Further, five light emitting diodes (hereinafter referred to as LEDs) 8b, 8c, . . . , and 8f, for example, which constitute a high-luminance, self-glowing light emitting display section, are arranged at regular angular intervals, on the front face of the instrument board 3. The LEDs 8b to 8f are located concentrically with the pointer 5a of the fuel gauge 5 and outside the slits 5b to 5f in the radial direction of the pointer 5a. These LESs form a circular arc as a whole.

Figure 3:
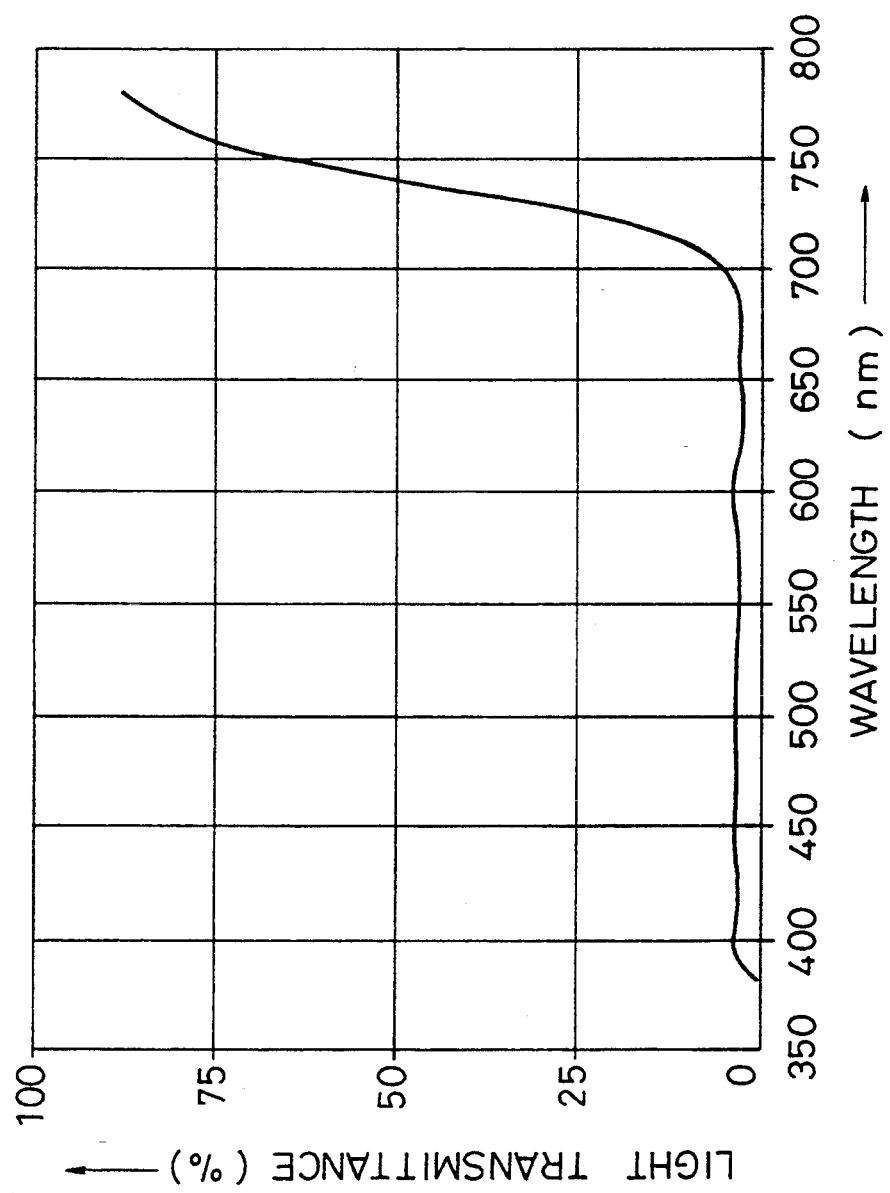
FIG. 3 shows a spectral characteristic curve of a black-face glass which constitutes a meter glass shown in FIGS. 1 and 2.

A translucent meter glass (hereinafter referred to as black-face glass) 9 called as black-face glass is attached to the front face of the case 2. The glass 9, which is smoke-colored, is obtained by adding a desired amount of black pigment or the like to transparent acrylic resin glass. As shown in FIG. 3, the glass has a characteristic to exhibit a flat, low light transmittance, preferably at about 3.5%, within a visible region (380 to 780 nm). Thus, only a high-luminance light can be transmitted through the black-face glass 9 in a great enough quantity for visual perception.

The light transmittance of the black-face glass 9 should only be set within the range of about 3 to 5%. If the light transmittance is lower than the lower limit value, about 3% of this range, light sources with very high luminance are required for satisfactory visual perception. In this case, it is difficult to select proper light sources for the vehicular display apparatus. If the light transmittance is higher than the upper limit value, about 5%, of the aforesaid range, the background of the display sections (pointers and silts) can be seen from the driver's-seat side, so that the contrast between the display sections and the background is lessened, and the visibility of the meter display is lowered.

A control circuit 100 as display switching means is provided on the rear side of the case 2. A selector switch 110 of, e.g., the push type, is arranged in a specific position at the lower portion of the front face of the black-face glass 9. The switch 110, which can be manually operated by the driver, is used to select an arbitrary one of a first display mode (main display state) and a second display mode (sub-display state) for the fuel gauge 5.

The control circuit 100 comprises a processor having discriminating and calculating functions; an output circuit including driver circuits and connected to the respective drive sections of the speedometer 4 and the fuel gauge 5, the cold-cathode discharge tubes 6 and 7, and the LEDs 8b to 8f; and an input circuit including A/D converters and connected to the selector switch 110 and various sensors, such as a vehicle speed sensor 121 attached to the vehicle, a liquid level sensor 122 in a fuel tank for detecting the fuel residue, etc. Numeral 123 generally designates other sensors. The control circuit 100 is designed to discriminate whether the first or second display mode for the fuel gauge 5 is selected, on the basis of a switch signal delivered from the selector switch 110 and indicative of the shift position of switch 110. Based on sensor signals from the various sensors, moreover, the circuit 100 is designed to deliver control outputs used to control the drive of the respective drive sections or display sections of the various meters. Further, the control circuit 100 includes a memory circuit 101 for storing, as display mode information, the switch signal from the selector switch 110, which is indicative of the display mode, i.e., the respective states of display operation of the cold-cathode discharge tube 7 and the LEDs 8b to 8f of the fuel gauge 5. Thus, the display mode information for the point of time immediately before an engine stop (ignition-key off operation) is stored in the memory circuit 101 so that it can be read out from the circuit 101 in starting the engine.

In the following, the operation of the combination meter 1 constructed in the above manner will be explained.

The control circuit 100, for use as the display switching means, is activated the moment an ignition key (not shown) is turned on to start the engine, and reads out from the memory circuit 101 the display mode information which is indicative of the display mode selected immediately before a halt of the preceding cycle of vehicle drive, and therefore, selected when the ignition key is turned on. Then, based on the display mode information, the circuit 100 discriminates the selected display mode, first or second.

If it is concluded that the first display mode is selected when the ignition key is on, the control circuit 100 drives the drive section of the speedometer 4 so that the distal end of the pointer 4a of the meter 4 rotates to a rotary position (position for the speed 0 km/h in this case) which corresponds to a vehicle speed signal supplied from the vehicle speed sensor 121. At the same time, the control circuit 100 turns on the cold-cathode discharge tube 6 to effect analog display of the vehicle speed. Also, the control circuit 100 drives the drive section of the fuel gauge 5 so that the distal end of the pointer 5a of the gauge 5 rotates to a rotary position which corresponds to a fuel residue signal from the liquid level sensor 122. At the same time, the control circuit 100 turns on the cold-cathode discharge tube 7, and turns off all the LEDs 8b to 8f, so that the fuel residue is displayed in the first display mode.

In this case, the light emitted from the cold-cathode discharge tube 6 is transmitted through the slits (graduations) 4b to 4l, which constitute the light transmitting display section of the speedometer 4 on the instrument board 3, and illuminates the respective pointers 4a and 5a of the speedometer 4 and the fuel gauge 5. On the other hand, a light emitted from the cold-cathode discharge tube 7 is transmitted through the slits (graduations) 5b to 5f, which constitute the light transmitting display section of the fuel gauge 5 on the instrument board 3.

Both the lights emitted from the cold-cathode discharge tubes 6 and 7 have high luminance, so that the light transmitted through the slits 4b to 4l, the light used to illuminate the pointers 4a and 5a, and the light transmitted through the slits 5b to 5f are transmitted through the black-face glass 9 in a great enough quantity for visual perception from the driver's-seat side. That is, when the ignition key is turned on, the graduations 4b to 4l and 5b to 5f and the pointers 4a and 5a of the speedometer 4 and the fuel gauge 5 are illuminated, so as to be visually perceived in contrast with the glass 9. At this point of time, the LEDs 8b to 8b, which are arranged corresponding individually to the graduations of the fuel gauge 5, are off. Since the black-face glass 9 is used as the meter glass for the meter 4 and the gauge 5, all other regions except the graduations and pointers of the individual meters, including the graduations 4b to 4l and 5b to 5f and the pointers 4a and 5b on the instrument board 3, cannot be visually perceived at all from the driver's-seat side. In other words, only the graduations and pointers of the meters can be recognized. Thus, the degree of contrast between the meter display and the background is very high, so that the meters can enjoy improved visibility.

If it is concluded, on the other hand, that the second display mode is selected when the ignition key is on, the control circuit 100 carries out analog display of the vehicle speed in the same manner as the case of the first display mode. Also, the circuit 100 turns off the cold-cathode discharge tube 7, and turns on the LEDs 8b to 8f, so that the fuel residue is displayed in the second display mode by means of the pointer 5a, illuminated by the glowing cold-cathode discharge tube 6, and the LEDs 8b to 8f. In this case, the high-luminance light from the LEDs 8b to 8f on the front face of the instrument board 3 transmitted through the black-face glass 9, and visually perceived as sub-display graduations of the fuel gauge 5.

As long as the ignition key is on, thereafter, the display mode can be manually set as required by means of the selector switch 110. Every time the driver manually operates the switch 110 to change its shift position, the display mode of the fuel gauge 5 is switched between the first display mode (main display state) where the graduations of the gauge 5 are displayed by means of the light emitted from the cold-cathode discharge tube 7 and then transmitted through the slits 5b to 5f, and the second display mode (sub-display state) where the fuel gauge graduations are displayed by means of the light from the LEDs 8b to 8f. Thus, the image of the fuel gauge 5 varies.

When the ignition key is turned off, thereafter, the display mode information for the current time is loaded into the memory circuit 101.

In the following, a vehicular display apparatus according to a second embodiment of the present invention will be explained.

As compared with the apparatus of the first embodiment where the slits 5b to 5f, which constitute the light transmitting display section, and the LEDs 8b to 8f, which constitute the light emitting display section, are arranged inside the meter glass 9 so that the display mode of the fuel gauge 5 can be changed by selectively using one of the two display sections, the apparatus of the second embodiment differs therefrom mainly in that analog or digital display is selectively effected for a speedometer by selectively using either one of a light transmitting display section for analog display inside a meter glass and a light emitting display section for digital display outside the glass.

Further, the apparatus of the second embodiment is designed as an improved version of the above-described conventional combination meter of the two-mode type, which will be further described below with reference to the drawing of FIG. 7.

Figure 7:
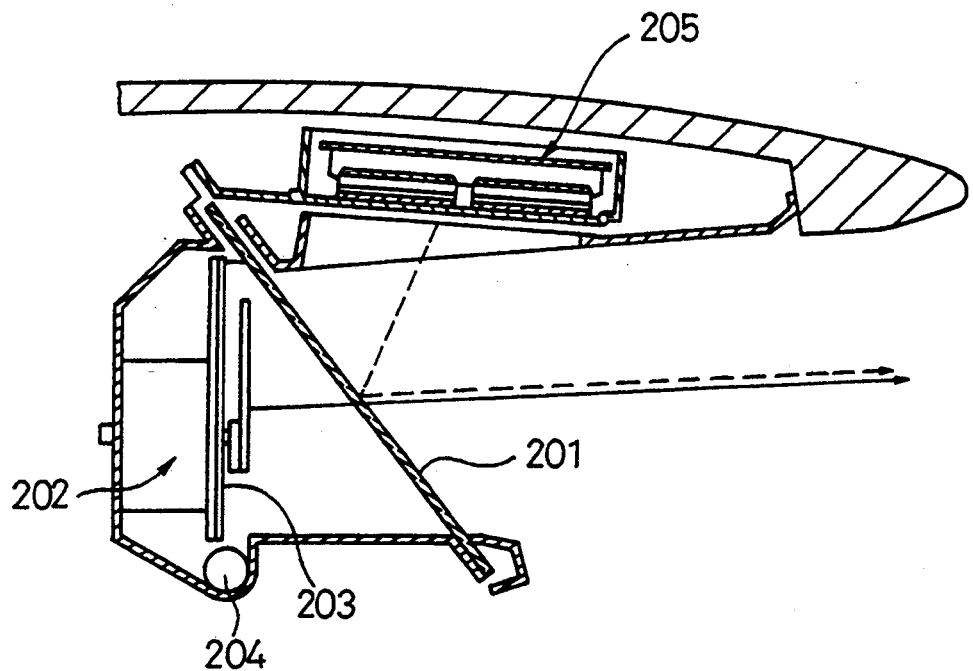
FIG. 7 is a sectional view of a conventional combination meter of the two-mode type.

Referring to FIG. 7, the conventional meter uses a surface glass 201 which is formed by sticking a half-mirror to a liquid crystal panel whose light transmittance is variable. A cathode discharge tube 204 for an analog speedometer 202 is disposed below the front face of an instrument board 203 so that the meter 202 is indirectly illuminated by means of the tube 204. Also, a digital speedometer 205 is disposed in front of and diagonally above the surface glass 201 so that a display on the meter 205 is reflected toward the driver's seat by the glass 201. For the analog display, the light transmittance of the liquid crystal panel is increased so that the panel is transparent, and the driver can visually perceive a real image (indicated by full line) produced by the analog speed meter 202 through the surface glass 201. For the digital display, on the other hand, the light transmittance of the panel is lowered so that the panel is opaque, and the driver can observe a display on the digital speedometer 205, reflected by the glass 201, as a virtual image (indicated by broken line). However, the combination meter constructed in this manner has many drawbacks. For instance, the display mode cannot be instantly switched between the real image display on the analog meter and the virtual image display on the digital meter at low temperature. Moreover, the degree of contrast between characters and the background of the real image display is low, and the visual angle is too narrow for high visibility. Furthermore, the liquid crystal panel and a drive unit therefor are expensive, and the analog display and the digital display may be superposed on each other in some cases.

Figure 4:
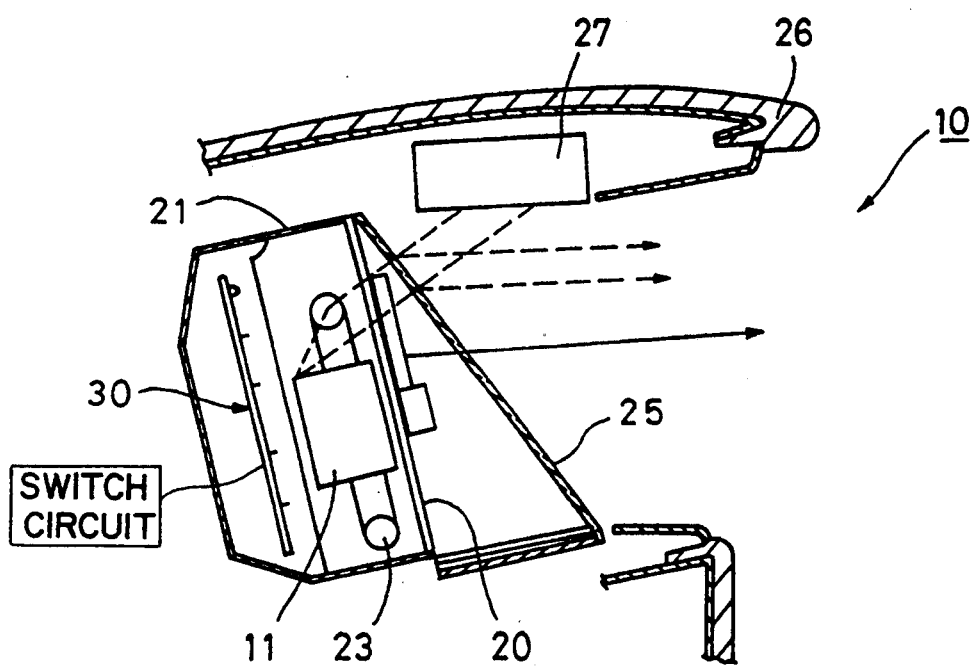
FIG. 4 is a sectional view showing a vehicular display apparatus according to a second embodiment of the present invention.
Figure 5:
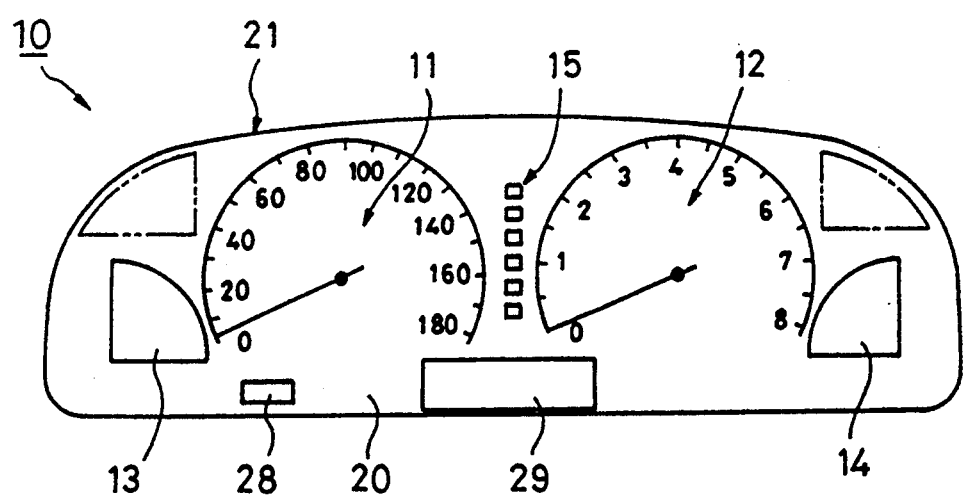
FIG. 5 is a front view showing the apparatus of Fig.4 in an analog display state.

Referring to FIGS. 4 and 5, there is shown in combination meter 10 for use as the vehicular display apparatus according to the second embodiment of the present invention. The meter 10 comprises a speedometer 11, tachometer 12, water temperature indicator 13, fuel gauge 14, and A/T (automatic transmission) indicator 15. The meters 11 to 15 are fixedly arranged on an instrument board 20 formed of a white transmitting illumination board, and are housed in a case 21. The meters 11 to 14 are analog meters which are constructed substantially in the same manner as the speedometer 4 and the fuel gauge 5 described before with reference to FIGS. 1 and 2, and are designed for transmissive illumination.

With regard to the speedometer 11, graduations and characters of the meter 11 are formed on the front face of the instrument board 20, and an arcuate high-luminance cathode discharge tube, e.g., cold-cathode discharge tube 23, is arranged along the meter graduations, on the rear side of the board 20. The instrument board 20 is illuminated from behind (or back-lit) by means of the discharge tube 23 so that the graduations, characters, and pointer of the speedometer 11 can be visually perceived from the driver's-seat side through a meter glass 25. The other meters 12 to 14 are arranged in like manner. The A/T indicator 15 includes figures on the front face of the board 20, which individually represent various A/T ranges, including a drive range D, neutral range N, parking range P, etc., and cold-cathode discharge tubes (not shown) corresponding individually to the figures. Thus, the indicator 15 indicates A/T range information.

The meter glass 25 is mounted in front or on the driver side of the instrument board 20. Like the meter glass 9 shown in FIG. 1, it is formed of black-face glass, e.g., acrylic resin glass. Thus, only a high-luminance light can be transmitted through the glass 25 in a great enough quantity for visual perception. Preferably, the black-face glass 25 has a low light reflectance of about 4%. The reflectance, which can be controlled by changing the material of the meter glass or by surface treatment, should only be within the range from 3% to 5%. If the reflectance is lower than the lower limit value of this range, the luminance of a digital speedometer 27 (mentioned later) must be made so high that it is difficult to select proper light sources for the vehicular display apparatus. If the reflectance is higher than the upper limit value of the range, the least luminous object, if any, on the driver's-seat side is reflected in the black-face glass 25. Accordingly, the meter display and the object overlap each other as they are observed from the driver's-seat side, so that the visibility of the meter display is lowered.

The digital speedometer 27 for radiantly displaying information, such as the vehicle speed and A/T range (drive range D, neutral range N, parking range P, etc.), on the black-face glass 25 is attached to a hood 26 of the combination meter 10 so as to be situated in front of and diagonally above the glass 25. A light emitting display section of the speedometer 27, which is formed of a fluorescent display tube (not shown), overlies and faces the glass 25 at a predetermined angle thereto. Thus, light emitted from the digital speedometer 27 is reflected toward the driver's seat by the black-face glass so that the vehicle speed display and A/T range information display radiated from the speedometer can be observed as virtual images by the driver.

A mode selector switch 28 for shifting the vehicle speed information display mode between analog and digital display modes is located in a predetermined position at the lower portion of the front face of the black-face glass 25, facing the driver's seat. An odo/trip meter 29, which is formed of a high-luminance fluorescent display tube, is disposed substantially in the center of the lower portion the instrument board 20. It is used always display the mileage digitally irrespective of the display mode of the speedometer. The odo/trip meter 29 is designed to selectively carry out odo-display or trip display.

Cold-cathode discharge tubes for back-lighting the meters 11 to 14 and the A/T indicator 15 (only the one for the speedometer 11 is designated by numeral 23), the mode selector switch 28, the odo/trip meter 29, etc. are connected to a control circuit 30 which is arranged in the case 21.

Next, the operation of the combination meter constructed in this manner will be explained.

The moment the ignition key is turned on, as in the case of the combination meter 1 shown in Figs. 1 and 2, the control circuit 30 reads out from a memory circuit (which corresponds to the element 101 of 1) information which is indicative of the display mode selected immediately before a halt of the preceding cycle of vehicle drive. Then, based on this display mode information, the circuit 30 effects analog display by means of the meters 11 to 15 or digital display by means of the digital speedometer 27.

If it is concluded that the analog display is selected in accordance with the display mode information when the ignition key is on, the control circuit 30 drives the respective drive sections of the meters 11 to 14, in response to sensor signals from various sensors (which correspond to the sensors 121 to 123 of FIG. 1), so that the respective pointers the meters 11 to 14 rotate to rotary positions which correspond individually to the sensor signals, and the cold-cathode discharge tubes for the meters 11 to ]4 are turned on. Further, the corresponding one of the cold-cathode discharge tubes for the various A/T ranges of the A/T indicator 15 is lit. As a result, the meters 11 to 14 and the A/T indicator 15 are subjected to transmissive illumination or back-light illumination by means of the high-luminance cold-cathode discharge tubes, and are displayed on the black-face glass 25, as shown in FIG. 5. This display is a real image display, as indicated by full line in FIG. 4, and the use of the transmissive illumination by means of the high-luminance cold-cathode discharge tubes provides a high degree of contrast between the graduations, characters, and pointers of the meters and the background. Also, the visual angle is wider than that of the liquid crystal panel, and the meters enjoy high visibility.

The odo/trip meter 29 is illuminated with high luminance by means of a light source (not shown) which is independent of those of the meters 11 to 14 and the A/T indicator 15, so that the mileage is digitally displayed on the black-face glass 25 in an odo-display or trip display mode. The meter 29 never fails to perform display operation without regard to the shift position of the mode selector switch 28.

In the analog display mode, the digital speedometer 27 is in an inoperative state, so that no irradiation from the meter onto the black-face glass 25 is made.

If it is concluded that the digital display mode is selected in accordance with the display mode information when the ignition key is on, the control circuit 30 turns off the respective cold-cathode discharge tubes of the analog meters 11 to 15, and activates the digital speedometer 27. As a result, the display of the analog meters 11 to 15 on the black-face glass 25 is stopped.

Figure 6:
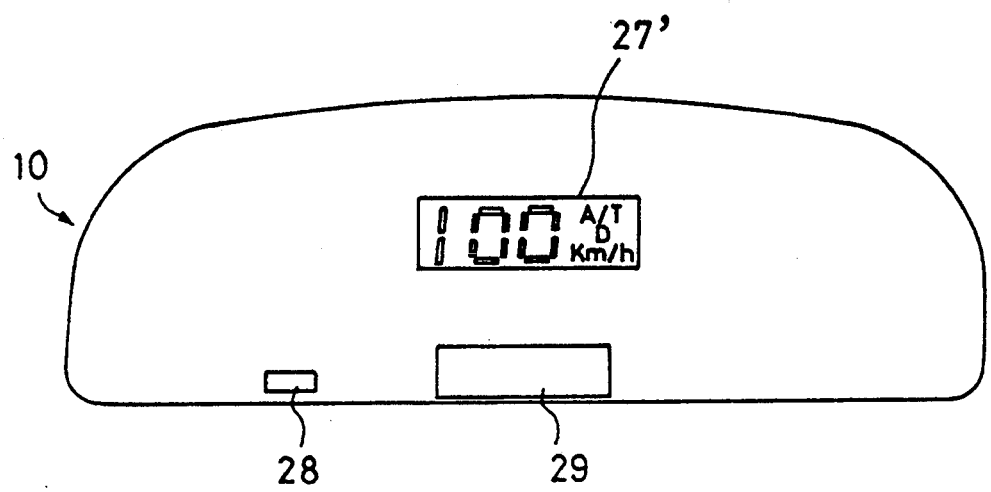
FIG. 6 is a front view showing the apparatus of FIG. 4 in a digital display state.

The digital speedometer 27, which includes the light emitting display section formed of the fluorescent display tube, radiantly displays a digital value and a symbol, which are indicative of the current vehicle speed and the current A/T range, respectively. Light beams corresponding to the digital value and the symbol are applied to the blackface glass 25, and are reflected toward the driver's seat, as indicated by broken line in FIG. 4. Thereupon, the digital value (e.g., 100 km/h) indicative of the current vehicle speed and the symbol (e.g., D) indicative of the current A/T range are displayed on a position designated by numeral 27' in FIG. 6, and are observed as virtual images by the driver. The meter display on the black-face glass 25 enjoys a high degree of contrast with the background and high visibility.

If the driver manually shifts the mode selector switch 28 from a position for the digital display mode to a position for the analog display mode while he is driving the vehicle, the display mode is switched from the digital display to the analog display. If the switch 28 is shifted to the position for the digital display mode, on the other hand, the display mode is switched to the digital display mode.

It is to be understood that the present invention is not limited to the first and second embodiments described above, and that various changes and modifications may be effected therein by one skilled in the art without departing from the scope or spirit of the invention.

In the first embodiment, for example, the fuel gauge 5 can be switched between the main display by means of the cold-cathode discharge tubes and the sub-display by means of the LEDs 8b to 8f. However, one or more alternative meters, e.g., the speedometer 4, may be designed for switching between main display and sub-display.

In the second embodiment, the display mode for the speedometer is switched between the analog and digital display modes. However, the display mode may be switched for one or more alternative meters, e.g. a tachometer.

According to the present invention, moreover, the display apparatus may be arranged so as to enjoy both the feature of the first embodiment, in which the main display or sub-display mode is selectively established, and that of the second embodiment, in which the analog or digital display mode is selectively established.

According to the first and second embodiments, furthermore, the mode is changed by means of the manual selector switch 28 or 110. Alternatively, however, a switch circuit, which responds to the operating state of the vehicle, may be used to change the vehicle speed display mode automatically, so that the vehicle speed is subjected to digital display if constant-speed drive is continued for a predetermined period of time, for instance, and to analog display if not. The control circuits 30 and 100 may be modified so that they can serve for the function of this switch circuit.

What is claimed is:

1. A vehicular display apparatus comprising:
   at least one first display means including a light source including means for emitting a high luminance light and a light transmitting display section opposed to the light source, so that a real image is be displayed;
   at least one second display means including a self-glowing light emitting display section including means for emitting a high luminance light, so that a real image displayed;
   a meter glass having at least one means for transmitting low light and for reflecting low light;
   means for switching;
   control means for selectively activating one of said at least one first display means and said at least one second display means in accordance with an operating state of said means for switching, so that at least one of said first display means or said at least second display means is displayed;
   an instruments board;
   wherein said light transmitting display section is disposed on the instrument board, said light emitting display section is located on a surface of said instrument board; and
   said meter glass is located physically in front of said at least one of said first display means and said at least one second display means.

2. The vehicular display apparatus according to claim 1, wherein said means for switching is a selector switch which is manually operable.

3. The vehicular display apparatus according to claim 1, wherein said means for switching is a switch circuit responsive to operating modes of a vehicle containing said display apparatus.

4. The vehicular display apparatus according to claim 1, wherein said light emitting display section is disposed on that region of the surface of said instrument board which corresponds to the light transmitting display section.

5. The vehicular display apparatus according to claim 1, wherein said at least one first display means is an analog display.

6. The vehicular display apparatus according to claim wherein said at least one second display means is a digital display.

7. The vehicular display apparatus according to claim 1, wherein said meter glass is formed of black-face glass that includes an amount of pigment in transparent acrylic resin glass to provide the black face.

8. The vehicular display apparatus according to claim 1, wherein the light transmittance of said meter glass ranges from approximately 3% to 5%.

9. The vehicular display apparatus according to claim 1, wherein the light reflectance of said meter glass ranges from approximately 3% to 5%.

10. The vehicular display apparatus according to claim 1, wherein said light source of said at least one first display means is a cold-cathode discharge tube.

11. The vehicular display apparatus according to claim 1, wherein said light emitting display section is a light emitting diode including means for emitting light of high luminance.

12. The vehicular display apparatus according to claim 1, wherein said display apparatus is mounted in a vehicle having an engine; and wherein said means for display switching includes a storage section for storing information on states of display operation of said at least one first display means and said at least one second display means immediately before the engine is stopped, said means for display switching being operable to selectively activate a corresponding one of said at least one first display means and said at least one second display means upon start of an engine operation, in accordance with the information stored in said storage sections.

13. A vehicular display apparatus comprising:
at least one first display means including a light source including means for emitting a high luminance light and a light transmitting display section opposed to the light source;
at least one second display means including a self-glowing light emitting display section including means for emitting a high luminance light;
a meter glass having at least one means for transmitting low light and for reflecting low light;
means for switching;
means for changing a display by selectively activating one of said at least one first display means and said at least one second display means in accordance with an operating state of said means for switching;
wherein said meter glass is physically located in front of said at least one first display means; and
wherein said light emitting display section of said at least one second display means is physically located on a side away from said at least one first display means, so that the meter glass is located behind said at least one second display means.

14. The vehicular display apparatus according to claim 13, wherein said light emitting display section is a fluorescent display tube including means for emitting light of high luminance.

15. The vehicular display apparatus according to claim 13, wherein said means for switching is a selector switch which is manually operable.

16. The vehicular display apparatus according to claim 13, wherein said means for switching is a switch circuit responsive to operating modes of a vehicle furnished with said display apparatus.

17. The vehicular display apparatus according to claim 13, wherein said at least one first display means is an analog display.

18. The vehicular display apparatus according to claim 13, wherein said at least one second display means is a digital display.

19. The vehicular display apparatus according to claim 13, wherein said meter glass is formed of black-face glass that includes an amount of pigment in transparent acrylic resin glass to provide the black-face.

20. The vehicular display apparatus according to claim 13, wherein the light transmittance of said meter glass ranges from approximately 3% to 5%.

21. The vehicular display apparatus according to claim 13, wherein the light reflectance of said meter glass ranges from approximately 3% to 5%.

22. The vehicular display apparatus according to claim 13, wherein said light source of said at least one first display means is a cold-cathode discharge tube.

23. The vehicular display apparatus according to claim 13, wherein said display apparatus is mounted in a vehicle having an engine; and wherein said means for display switching includes a storage section for storing information on states of the display operation of said at least one first display means and said at least one second display means immediately before the engine is stopped, said means for display switching being operable to selectively activate a corresponding one of said at least one first display means and said at least one second display means upon start of an engine operation, in accordance with the information stored in said storage operation.

* * * * *